US012586312B2

(12) United States Patent
Haag et al.

(10) Patent No.: US 12,586,312 B2
(45) Date of Patent: Mar. 24, 2026

(54) METHOD AND DEVICE FOR DETERMINING CONCEALED OBJECTS IN A 3D POINT CLOUD REPRESENTING AN ENVIRONMENT

(71) Applicant: Robert Bosch GmbH, Stuttgart (DE)

(72) Inventors: Norman Haag, Stuttgart (DE); Jan Sparbert, Rutesheim (DE); Stefan Spiessberger, Weinstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 201 days.

(21) Appl. No.: 18/560,159

(22) PCT Filed: May 17, 2022

(86) PCT No.: PCT/EP2022/063227
§ 371 (c)(1),
(2) Date: Nov. 10, 2023

(87) PCT Pub. No.: WO2022/243262
PCT Pub. Date: Nov. 24, 2022

(65) Prior Publication Data
US 2024/0242432 A1      Jul. 18, 2024

(30) Foreign Application Priority Data

May 19, 2021     (DE) ..................... 10 2021 205 061.1

(51) Int. Cl.
*G06T 17/00*          (2006.01)
*G01S 17/89*          (2020.01)
          (Continued)

(52) U.S. Cl.
CPC .............. *G06T 17/00* (2013.01); *G01S 17/89* (2013.01); *G06T 7/62* (2017.01); *G06T 7/70* (2017.01);
          (Continued)

(58) Field of Classification Search
CPC ... G06T 17/00; G06T 7/62; G06T 7/70; G01S 17/89; G01S 7/4802; G01S 7/4808;
          (Continued)

(56) References Cited

U.S. PATENT DOCUMENTS

| | | | |
|---|---|---|---|
| 10,551,485 B1 * | 2/2020 | Maheshwari | ........... G01S 17/87 |
| 2014/0118716 A1 * | 5/2014 | Kaganovich | .............. G06T 7/74 |
| | | | 356/4.01 |

(Continued)

FOREIGN PATENT DOCUMENTS

| | | |
|---|---|---|
| DE | 102007048809 A1 | 7/2008 |
| DE | 102016224764 A1 | 6/2018 |

(Continued)

OTHER PUBLICATIONS

J. Zhao, H. Xu, X. Xia and H. Liu, "Azimuth-Height Background Filtering Method for Roadside LiDAR Data," 2019 IEEE Intelligent Transportation Systems Conference (ITSC), Auckland, New Zealand, 2019, pp. 2421-2426, doi: 10.1109/ITSC.2019.8917369. (Year: 2019).*

(Continued)

*Primary Examiner* — Said Broome
*Assistant Examiner* — Jordan Wan Yick
(74) *Attorney, Agent, or Firm* — NORTON ROSE FULBRIGHT US LLP

(57)                ABSTRACT
A method and a device for determining concealed objects in a 3D point cloud representing an environment. The method includes: producing a 3D point cloud using an active sensor, wherein each point of the 3D point cloud represents a distance measurement by the active sensor; determining a background region within the 3D point cloud; determining shadows within the background region of the 3D point cloud, shadows being the regions within the background region at which there are no points of the 3D point cloud;

(Continued)

and determining, in the environment of the sensor, an object which is concealed by crosstalk in the sensor, by identifying, in the background region of the 3D point cloud, at least one shadow which cannot be attributed to an object in the foreground of the 3D point cloud.

7 Claims, 2 Drawing Sheets

(51) Int. Cl.
  *G06T 7/62* (2017.01)
  *G06T 7/70* (2017.01)
  *G06V 10/26* (2022.01)
(52) U.S. Cl.
  CPC .......... *G06V 10/26* (2022.01); *G06V 2201/07*
  (2022.01)
(58) Field of Classification Search
  CPC .......... G01S 17/04; G01S 17/86; G01S 17/42;
  G01S 17/894; G01S 17/931; G06V 10/26;
  G06V 2201/07
  See application file for complete search history.

(56) References Cited

U.S. PATENT DOCUMENTS

| | | | |
|---|---|---|---|
| 2019/0361098 A1 | 11/2019 | Hollmann et al. | |
| 2020/0056973 A1 | 2/2020 | Knox et al. | |
| 2020/0232799 A1* | 7/2020 | Parchami | G01C 21/20 |
| 2021/0033711 A1* | 2/2021 | Helsloot | G01S 7/4817 |

FOREIGN PATENT DOCUMENTS

| | | | |
|---|---|---|---|
| DE | 102018214959 A1 | 3/2020 |
| DE | 102020004791 A1 | 11/2020 |
| JP | 2010271166 A | 12/2010 |
| JP | 2012255657 A | 12/2012 |
| JP | 2016224854 A | 12/2016 |
| JP | 2018107578 A | 7/2018 |

OTHER PUBLICATIONS

International Search Report for PCT/EP2022/063227, Issued Sep. 20, 2022.

* cited by examiner

METHOD AND DEVICE FOR DETERMINING CONCEALED OBJECTS IN A 3D POINT CLOUD REPRESENTING AN ENVIRONMENT

FIELD

The present invention relates to a method and a device for determining concealed objects in a 3D point cloud representing an environment.

BACKGROUND INFORMATION

Lidar systems are highly sensitive distance measuring devices which, on the basis of travel time measurements of transmitted and received laser light, determine a distance between a remote object in the environment of the lidar system and the lidar system. Typically, such systems aim at ranges of 100 m to 300 m, which places very high demands on the lidar system transmission and reception technology used. An important aspect here is that only the light actually backscattered by the remote object is detected by the system and not any scattered or interfering light that may be present (generally referred to as crosstalk).

In particular when highly reflective objects are present in the environment of the lidar system, it is possible for crosstalk resulting therefrom to cause such an object to be perceived as larger than it actually is by a detector of the lidar system, as a result of which regions adjacent to the object can be overlit and thereby concealed. Such crosstalk generally occurs within a certain depth region, which is composed of the region of the crosstalk itself and a dead time of the detector. Objects that are located behind the dead time concealment region from the point of view of the lidar system can accordingly be detected again.

German Patent Application No. DE 10 2018 214 959 A1 describes, according to one aspect, a method for evaluating data of an environment sensor, wherein surface properties of at least one object are recognized and/or are determined on the basis of access to a database. For example, a vehicle behind a guardrail can be detected while the vehicle is detected solely as a reflected ghost vehicle due to concealment by a preceding vehicle. By means of the method, a reflective surface of the guardrail can be either recognized or taken from a map.

German Patent Application No. DE 10 2007 048 809 A1 describes a method for recognizing concealed objects in road traffic. In one embodiment, the surrounding area of a vehicle on the one hand and movement variables of the ego vehicle on the other hand are sensed by means of sensors, wherein these are transmitted as information to vehicles located in the environment by means of an interface for vehicle-to-vehicle communication and are received by the vehicles located in the environment.

SUMMARY

According to a first aspect of the present invention, a method for determining concealed objects in a 3D point cloud representing an environment is provided.

For this purpose, in a first step of the method according to an example embodiment of the present invention, a 3D point cloud is produced by means of an active sensor, wherein each point of the 3D point cloud represents a distance measurement by the active sensor. The active sensor can in principle be any sensor. Advantageously, the active sensor is an environment sensor of a vehicle, in particular a road vehicle (for example, passenger car, truck, bus, two-wheeler, etc.), without the active sensor thereby being limited to such use. An active sensor means a sensor that, in order to sense an environment, first emits a scanning signal into the environment (for example, sound waves or electromagnetic waves) and senses portions of the scanning signal backscattered by the environment to the active sensor, by means of a suitable detector. By means of measurement signals generated by the detector, it is then possible to create a 3D point cloud that represents the respective environment and on the basis of which it is possible, for example, to determine objects within this 3D point cloud. It should be noted that in this context there are no restrictions with regard to the characteristic of the scanning signal. For example, the active sensor fully excites a region of the environment to be sensed by means of the scanning signal at the same point in time and senses it all at a different point in time. Alternatively, it is also possible to divide the entire region to be sensed into individual subsections and to excite and sense them in chronological succession (e.g., in the form of a punctiform or linear scanning of the environment).

In a second step of the method according to an example embodiment of the present invention, a background region is determined within the 3D point cloud. The background region of the 3D point cloud results, for example, from trees and/or buildings and/or mountain slopes and/or ground surfaces present in the environment (in particular when the active sensor has an inclination in the direction of such a ground surface), etc., which backscatter the scanning signal of the active sensor, wherein the background region does not necessarily have to be a contiguous region within the 3D point cloud, but may also be composed of multiple disjoint background regions. In addition, for the method according to the present invention, it is not absolutely necessary for the determined background region to be oriented substantially perpendicular to a main axis of the active sensor, even if such an orientation is particularly advantageous. Criteria for determining the background region are discussed in more detail below in the description of advantageous embodiments of the present invention.

In a third step of the method according to an example embodiment of the present invention, shadows within the background region of the 3D point cloud are determined, wherein shadows are the regions within the background region at which there are substantially no points of the 3D point cloud. "Substantially no points" is intended to mean that even if there is complete shadowing within the background region, it is possible for individual points in the 3D point cloud to be produced during an environment sensing operation by the active sensor, said points being caused, for example, by noise or other influences in the active sensor. In other words, shadows are considered to be the regions within the background region that have a lower density, clearly distinguishable from the rest of the background region, of points of the 3D point cloud in the area of the background region.

In a fourth step of the method according to an example embodiment of the present invention, an object (or multiple objects) which is concealed by optical and/or electrical crosstalk in the active sensor is determined in the environment of the active sensor, by identifying, in the background region of the 3D point cloud, at least one shadow which cannot be attributed to an object in a foreground of the 3D point cloud. Such crosstalk is caused, for example, by a highly reflective object (for example, a retroreflector such as a traffic sign, etc.) in the environment of the active sensor.

The foreground of the 3D point cloud is intended to mean a region located between the active sensor and the background region.

Particularly affected by such crosstalk are objects located in the immediate vicinity of a highly reflective object from the point of view of the active sensor (to the side and/or above and/or below the highly reflective object from the point of view of the active sensor) and substantially at the same distance from the active sensor as the highly reflective object. Depending on the sensor type and/or detector technology used, it is also possible for a highly reflective object to conceal, by crosstalk, an object in the immediate vicinity that is located at a greater distance from the active sensor than the highly reflective object. This occurs, for example, when the object, seen from the point of view of the active sensor, is located in a dead time concealment region behind the highly reflective object, which region results from a dead time of the detector (for example, a SPAD detector) and/or downstream electronics of the active sensor, when echoes generated by the highly reflective object are sensed in the active sensor.

On the basis of the above-described method according to the present invention, it is particularly advantageously possible for objects that cannot be identified otherwise due to crosstalk to be identified in the foreground indirectly by the evaluation of shadows, so that the reliability of an environment sensing operation on the basis of the active sensor can be improved. In particular when the method according to the present invention is used in conjunction with environment sensing systems of vehicles, it is therefore possible to improve protection for such vehicles and/or for objects (in particular persons) in the environment of these vehicles. This can enable a significant increase in the safety and/or reliability of such vehicles in particular in conjunction with semi-autonomously or autonomously driving vehicles. A further important advantage of the present invention results from the fact that it is not absolutely necessary to modify an existing hardware configuration (comprising, for example, the active sensor and a control unit corresponding thereto, etc.) in order to carry out the method according to the present invention, since the information used here regarding shadows present in the background region of the 3D point cloud (i.e., defects of points in the background region) can in principle be sensed or is already sensed by existing active sensors, but is not evaluated in the related art.

Preferred developments of the present invention are disclosed herein.

According to an advantageous embodiment of the present invention, the background region within the 3D point cloud is identified by identifying the last echo for each solid angle of the 3D point cloud, said echo resulting from a scanning signal emitted by the active sensor. Alternatively or additionally, the background region is identified by determining contiguous areas within the 3D point cloud that have a predefined minimum distance from the active sensor and/or are oriented within a predefined angle range in relation to a main axis of the active sensor and/or have a predefined minimum size. It is also possible, alternatively or additionally, to use different criteria from these to determine the background region.

In a particularly advantageous further embodiment of the present invention, a type and/or a size and/or a position of the concealed object is determined on the basis of a characteristic of the shadow produced by this object. For example, image recognition algorithms from the related art are used for this purpose. In this context, it is possible for a perspective equalization of identified shadows present, for example, in a background region that is not perpendicular to the main axis of the active sensor (for example in a road section ahead) to be carried out before and/or while such image recognition algorithms are executed. Identification of the type and/or size of the concealed object is advantageously applicable in particular when the shadow produced by the concealed object is completely or at least largely within the background region. In a case in which, for example, only a small portion of the object is present as a shadow in the background region, identification of the type and/or size of the object may not be possible, but it is still possible by determining the position to achieve a significant increase in the reliability and/or safety of an environment sensing system on the basis of the method according to the present invention. A case in which an insufficient portion of an object for accurate identification appears as a shadow in the background region of the 3D point cloud is present, for example, if only lower extremities of a person are imaged from the point of view of the active sensor in front of the background region (for example, a road surface), while upper extremities are imaged from the point of view of the active sensor in front of the sky which, due to the distance from the active sensor, produces no points in the 3D point cloud.

The information about the shadow, determined in the background, of an object concealed in the foreground is preferably used to add points representing the concealed object to the 3D point cloud in a region of the foreground in which the concealed object was determined. This is particularly useful if a downstream system that uses the 3D point cloud as input data is not to be adapted for reasons of cost and/or effort and/or time. In this way, identified concealed objects, like regular (i.e., non-concealed) objects, of the 3D point cloud are passed on to a downstream system. Depending on the information present about the objects added in the 3D point cloud, said objects can be added in the 3D point cloud in an abstract form (for example, as simple geometric figures such as cuboids, cones, balls, etc.) or in a detailed form (e.g., as a 3D model of an identified object type in each case).

A dead time of a detector of the active sensor is preferably taken into account when determining a depth extent of the region in which points representing the concealed object are added in the 3D point cloud. As described above, such a dead time can mean that objects in the immediate environment of a highly reflective object can be covered not only when they each have the same distance from the active sensor, but also when objects that, from the point of view of the active sensor, have a greater distance than the highly reflective object from the active sensor are concealed by such a dead time. Advantageously, the points to be added are accordingly arranged at least in an entire depth region that can be influenced by the dead time. In this way, although the exact depth position of the concealed object is not available in a downstream processing operation, the coverage of a depth region caused by the dead time makes it possible to avoid a collision with the concealed object in any case.

According to an example embodiment of the present invention, advantageously, a plausibility check is made of the determined background region and/or the presence of a concealed object and/or a type and/or a size and/or a position of a concealed object and/or existing crosstalk by means of a further sensor (for example, by means of a camera), in particular an active sensor of a different type and/or a map material relating to a current environment. The plausibility check is based, for example, on a calculation of probabilities or confidences for above-mentioned elements to be plausibility-checked, so that when respective predefined probability threshold values or confidence threshold values are exceeded by the respective determined probability values or confidence values, the results of the respective determination can be assumed to be correct. Information about the plausibility check result is then preferably transmitted together with the information about the corresponding 3D point cloud to a downstream processing operation.

In a further advantageous embodiment of the present invention, the identification of shadows in the background region of the 3D point cloud takes place on the basis of a machine learning method. In this case, it is possible to use different machine learning methods described in the related art, which are trained, for example, on the basis of real sensed 3D point clouds and/or artificially generated 3D point clouds, such that it is made possible to reliably identify shadows in respective background regions of 3D point clouds. In addition to a pure identification of shadows on the basis of a machine learning method, it is also possible to determine a type and/or a size of concealed objects from the shadow information by means of such a machine learning method.

Advantageously, information about the concealed object and/or a 3D point cloud to which the concealed object is added is taken into account during environment recognition in an environment recognition system, which corresponds, for example, to the above-described downstream processing operation or the downstream system.

In a further advantageous embodiment of the present invention, the active sensor is a lidar sensor (for example, a flash lidar, a line scanner or a point scanner), and in particular a lidar sensor of an environment sensing system of a transportation means. A detector of such a lidar sensor is, for example, a SPAD-based detector or a different detector from this.

According to a second aspect of the present invention, a device for determining concealed objects in a 3D point cloud representing an environment is provided. According to an example embodiment of the present invention, the device has an active sensor (for example, a lidar sensor, a radar sensor, an ultrasonic sensor, etc.) and an evaluation unit, wherein the evaluation unit is configured on the basis of the active sensor to carry out a method according to the above description. The evaluation unit is designed, for example, as an ASIC, FPGA, processor, digital signal processor, microcontroller, or the like, and/or is a part of the active sensor itself or a part of a component other than the active sensor. The features, combinations of features and the advantages resulting therefrom correspond to those discussed in connection with the first-mentioned aspect of the preset invention, such that reference is made to the above statements in order to avoid repetitions.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
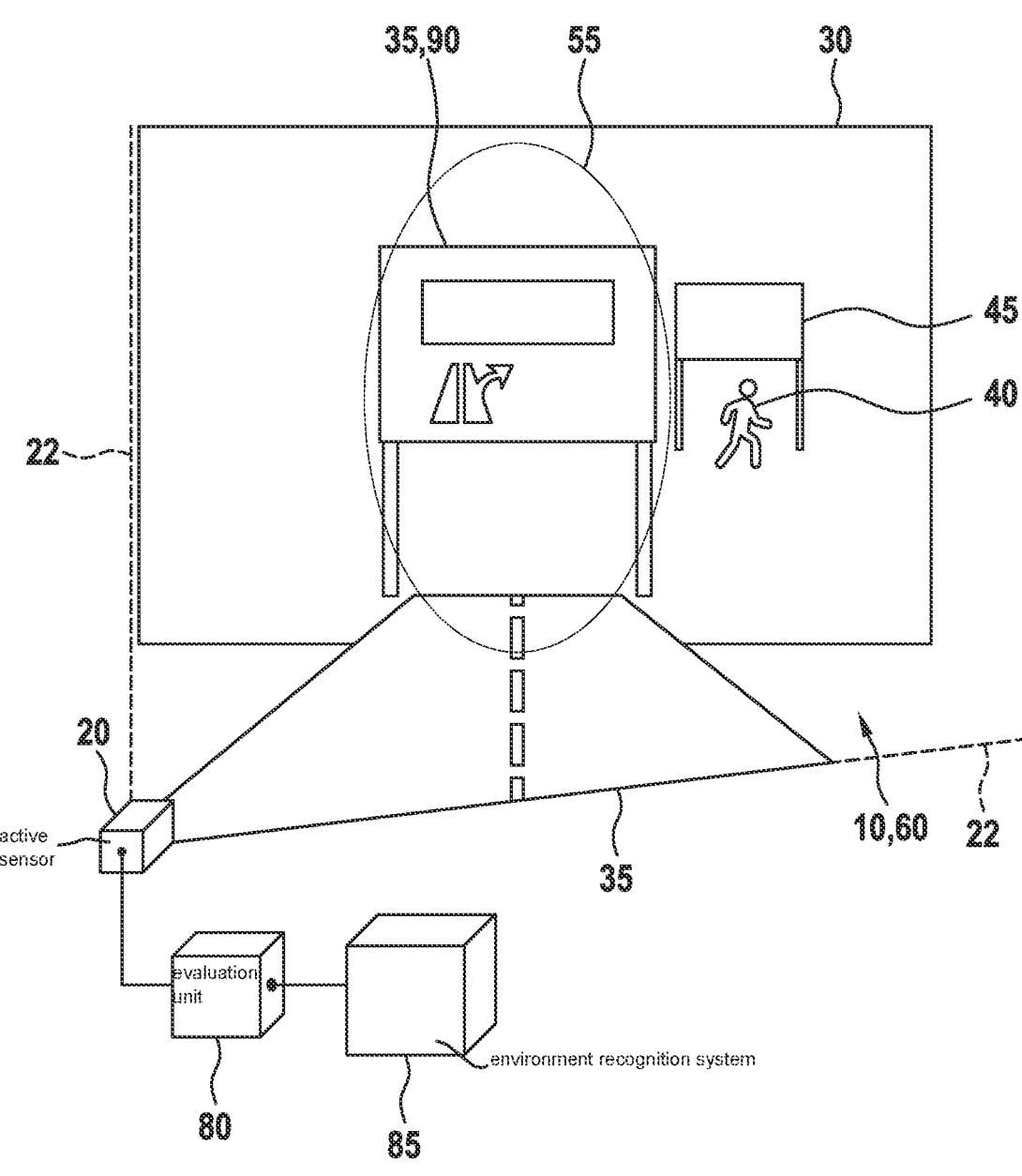
FIG. 1 shows a schematic view representing a first 3D point cloud to be processed on the basis of the method according to an example embodiment of the present invention.

FIG. 1 shows a schematic view representing a first 3D point cloud 10 to be processed on the basis of the method according to the present invention. For reasons of simplification and better clarity, the view in FIG. 1 is not shown in the form of individual points produced by an active sensor 20. The respective areas and objects shown are accordingly present in a real implementation in the form of uniform or non-uniform points of such a 3D point cloud. Here, the active sensor 20 is a lidar sensor that implements scanning of an environment 60 of the active sensor 20 on the basis of a line-scanning method, wherein a scanning line of the active sensor 20 here is a vertically oriented scanning line.

The active sensor 20 is, for example, a sensor arranged on a passenger car, which sensor transmits sensed environment information to an environment recognition system 85 of such a passenger car. For this purpose, the measurement data collected by the active sensor 20 are transmitted to an evaluation unit 80 according to the present invention, which is configured to carry out the method according to the present invention described above and to transmit results of the method to the environment recognition system 85.

A road section in which, among other things, a sign gantry 90 is located is sensed through the field of view 22 of the active sensor 20. Due to retroreflective properties of a sign of the sign gantry 90, crosstalk 55 is produced in a SPAD detector of the active sensor 20 during the scanning of the environment 60, which crosstalk covers regions in the detector that are located in a vertical extension of the sign of the sign gantry 90. Because of the crosstalk 55, an object 50 (not shown), which in this case is a person located below the sign, is concealed by the active sensor 20 in the course of the environment sensing operation.

The 3D point cloud 10 is analyzed by the evaluation unit 80 in order first to identify a background region 30 within the 3D point cloud 10. The background region 30 is produced, for example, by a forest and/or building lying ahead or a mountain slope, etc. The background region 30 is determined by determining the last-arrived echoes per solid angle region in each case.

Subsequently, shadows 40, 45 in this background region 30 are identified by means of the evaluation unit 80 by determining those regions in the background region 30, in which no or only a very small number of points of the 3D point cloud 10 are present. A machine learning method executed by the evaluation unit 80 is used for identifying the shadows 40, 45. It is then attempted to assign the identified shadows 40, 45 to objects in the foreground that produce these shadows 40, 45. Since no object 50 producing the first shadow 40 can be determined within the 3D point cloud 10 for the first shadow 40, it is determined that the first shadow 40 is produced with a high probability by a concealed object 50. A putative position of the object 50 causing the first shadow 40 within the 3D point cloud is determined on the basis of a position and characteristic of the first shadow 40 and a local relation of the first shadow 40 to the second shadow 45. The machine learning method is also used to estimate a type and a size of the object 50 on the basis of the determined first shadow 40.

The evaluation unit 80 then transmits the 3D point cloud 10, the information about the position, the type and the size of the concealed object 50 to the environment recognition system 85, which is configured on the basis of this information, for example, to adjust the guidance of the passenger car and/or to output a warning signal if there is a risk of the passenger car colliding with the concealed object 50.

Figure 2:
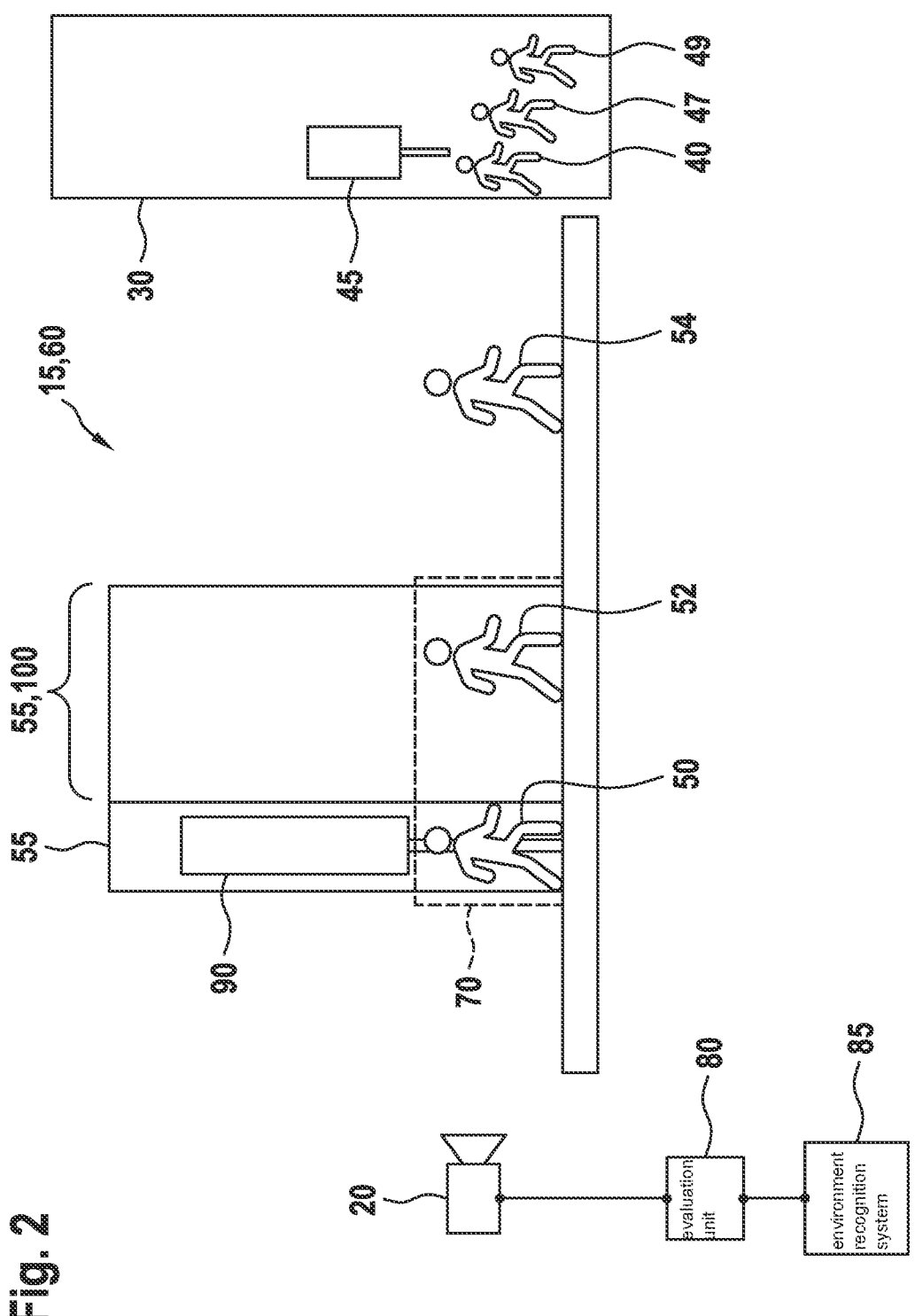
FIG. 2 shows a schematic view representing a second 3D point cloud to be processed on the basis of the method according to an example embodiment of the present invention.

FIG. 2 shows a schematic view representing a second 3D point cloud 15 of an environment 60 to be processed on the basis of the method according to the present invention. In the side view shown here, a concealed object 50 (first person) is located below a sign gantry 90, wherein a sign of the sign gantry has a highly reflective surface facing an active sensor 20. The active sensor 20 and a downstream processing chain connected thereto, consisting of an evaluation unit 80 and an environment recognition system 85, correspond to the description in FIG. 1, and therefore reference is made thereto in order to avoid repetitions.

Due to vertical and horizontal crosstalk 55 in a detector of the active sensor 20, the concealed object 50 is not sensed in the 3D point cloud 15. A further concealed object 52 (second person) is located, from the point of view of the active sensor 20, in a dead time concealment region 100, in which the further concealed object 52 likewise cannot be sensed when crosstalk 55 is present, due to a dead time of a detector of the active sensor 20. In addition, FIG. 2 shows a visible object 54 (third person) located below the sign gantry 90, but at a distance from the sign gantry 90 within which there is no concealment due to the dead time of the active sensor 20.

In a determined background 30, a first shadow 40 that corresponds to the concealed object 50, a second shadow 45 that corresponds to the sign gantry 90, a third shadow 47 that corresponds to the further concealed object 52 and a fourth shadow 49 that corresponds to the visible object 54 are automatically identifiable. On the basis of these shadows 40, 45, 47, 49, respective positions of the concealed object 50 and the further concealed object 52 within the environment 60 are determined. The 3D point cloud 15 is then supplemented by points 70 that mark the entire region in which the concealed object 50 and the further concealed object 52 are located with high probability. The added points 70 form a cuboid representing this region in the 3D point cloud 15.

Furthermore, it is possible to check the plausibility of the determined positions of the concealed objects 50, 52 by means of a further sensor, for example by means of a camera.

The invention claimed is:

1. A method for determining concealed objects in a 3D point cloud representing an environment, the method comprising the follow steps:
producing a 3D point cloud using an active sensor, wherein each point of the 3D point cloud represents a distance measurement by the active sensor;
determining a background region within the 3D point cloud;
determining shadows within the background region of the 3D point cloud, wherein the shadows are regions within the background region at which there are substantially no points of the 3D point cloud; and
determining, in an environment of the active sensor, an object which is concealed by crosstalk in the active sensor, by identifying, in the background region of the 3D point cloud, at least one shadow which cannot be attributed to an object in a foreground of the 3D point cloud,
wherein a type and/or a size and/or a position of the concealed object is determined based on a characteristic of the shadow produced by the object,
wherein the information about the shadow, determined in the background region, of the object concealed in the foreground is used to add points representing the concealed object to the 3D point cloud in a region of the foreground in which the concealed object was determined, and
wherein a dead time of a detector of the active sensor is taken into account when determining a depth extent of the region in which points representing the concealed object are added in the 3D point cloud.

2. The method according to claim 1, wherein the background region is identified within the 3D point cloud by:
identifying, for each solid angle of the 3D point cloud, a last echo resulting from a scanning signal emitted by the active sensor; and/or
determining contiguous areas within the 3D point cloud that:
have a predefined minimum distance from the active sensor, and/or
are oriented within a predefined angle range in relation to a main axis of the active sensor, and/or
have a predefined minimum size.

3. The method according to claim 1, wherein, using a further sensor of a different type than the active sensor and/or map material related to a current environment, a plausibility check is made of:
(i) the determined background region, and/or
(ii) a presence of the concealed object, and/or
(iii) a type and/or a size and/or a position of the concealed object, and/or
(iv) existing crosstalk.

4. The method according to claim 1, wherein the determination of the shadows in the background region of the 3D point cloud takes place using a machine learning method.

5. The method according to claim 1, wherein information about the concealed object and/or the 3D point cloud to which the concealed object is added is taken into account during environment recognition in an environment recognition system.

6. The method according to claim 1, wherein the active sensor is a lidar sensor of an environment sensing system of a transportation arrangement.

7. A device for determining concealed objects in a 3D point cloud representing an environment, comprising:
an active sensor; and
an evaluation unit;
wherein the evaluation unit is configured to determine concealed objects in a 3D point cloud representing an environment, the evaluation unit configured to:
produce a 3D point cloud using the active sensor, wherein each point of the 3D point cloud represents a distance measurement by the active sensor,
determine a background region within the 3D point cloud,
determine shadows within the background region of the 3D point cloud, wherein the shadows are regions within the background region at which there are substantially no points of the 3D point cloud, and
determine, in an environment of the active sensor, an object which is concealed by crosstalk in the active sensor, by identifying, in the background region of the 3D point cloud, at least one shadow which cannot be attributed to an object in a foreground of the 3D point cloud,
wherein a type and/or a size and/or a position of the concealed object is determined based on a characteristic of the shadow produced by the object,
wherein the information about the shadow, determined in the background region, of the object concealed in the foreground is used to add points representing the concealed object to the 3D point cloud in a region of the foreground in which the concealed object was determined, and wherein a dead time of a detector of the active sensor is taken into account when determining a depth extent of the region in which points representing the concealed object are added in the 3D point cloud.

\* \* \* \* \*